United States Patent
Kim et al.

(10) Patent No.: US 10,989,936 B2
(45) Date of Patent: Apr. 27, 2021

(54) OPTICAL MODULATION DEVICE INCLUDING MIRROR ELEMENTS AND NANO-ANTENNA ARRAY, METHOD OF OPERATING THE SAME, AND APPARATUS INCLUDING THE OPTICAL MODULATION DEVICE

(71) Applicant: SAMSUNG ELECTRONICS CO., LTD., Suwon-si (KR)

(72) Inventors: Sunil Kim, Hwaseong-si (KR); Junghyun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/263,081

(22) Filed: Jan. 31, 2019

(65) Prior Publication Data

US 2020/0081275 A1    Mar. 12, 2020

(30) Foreign Application Priority Data

Sep. 11, 2018 (KR) ................ 10-2018-0108527

(51) Int. Cl.
| | |
|---|---|
| *G02F 1/01* | (2006.01) |
| *G02F 1/19* | (2019.01) |
| *G02B 5/00* | (2006.01) |
| *G02B 26/02* | (2006.01) |
| *G01S 7/481* | (2006.01) |
| *G01S 17/02* | (2020.01) |
| *G02F 1/00* | (2006.01) |
| *G01S 17/04* | (2020.01) |
| *B82Y 20/00* | (2011.01) |

(52) U.S. Cl.
CPC .......... *G02F 1/0121* (2013.01); *G01S 7/4814* (2013.01); *G01S 17/04* (2020.01); *G02B 5/008* (2013.01); *G02B 26/02* (2013.01); *G02F 1/0018* (2013.01); *G02F 1/19* (2013.01); *B82Y 20/00* (2013.01)

(58) Field of Classification Search
CPC ........ G02F 1/0121; G01S 17/04; G01S 17/03; G02B 5/008
USPC .......................................................... 385/2
See application file for complete search history.

(56) References Cited

U.S. PATENT DOCUMENTS

| | | | | | |
|---|---|---|---|---|---|
| 4,615,595 | A | * | 10/1986 | Hornbeck | .......... G02B 26/0841 257/E27.157 |
| 6,849,914 | B2 | * | 2/2005 | Day | ....................... G02F 1/025 257/431 |
| 8,098,142 | B2 | * | 1/2012 | Schofield | ................ B60R 1/088 340/425.5 |
| 9,558,409 | B2 | * | 1/2017 | Pliefke | ...................... B60R 1/00 |
| 9,958,707 | B2 | * | 5/2018 | Atwater | ................. G02B 1/002 |

(Continued)

*Primary Examiner* — Akm E Ullah
(74) *Attorney, Agent, or Firm* — Sughrue Mion, PLLC

(57) ABSTRACT

Provided are an optical modulation device, a method of operating the optical modulation device, and an apparatus including the optical modulation device. The optical modulation device may include a mirror array including a plurality of mirror elements, a nano-antenna array including a plurality of nano-antennas, and an active layer disposed between the mirror array and the nano-antenna array. At least some of the plurality of mirror elements may have different refractive indices. The at least some of the plurality of mirror elements may include different materials, include different dopants, or have different doping concentrations.

20 Claims, 14 Drawing Sheets

(56) References Cited

U.S. PATENT DOCUMENTS

| | | | |
|---|---|---|---|
| 10,824,043 B2* | 11/2020 | Park | G02F 1/292 |
| 2012/0199565 A1* | 8/2012 | Nomaru | B23K 26/064 |
| | | | 219/121.67 |
| 2017/0176651 A1 | 6/2017 | Lee et al. | |
| 2017/0192300 A1* | 7/2017 | Chung | H01L 27/326 |
| 2018/0024412 A1* | 1/2018 | Kim | G02F 1/292 |
| | | | 359/315 |
| 2018/0180720 A1 | 6/2018 | Pei et al. | |
| 2019/0025509 A1* | 1/2019 | Kim | G01S 7/4817 |

* cited by examiner

OPTICAL MODULATION DEVICE INCLUDING MIRROR ELEMENTS AND NANO-ANTENNA ARRAY, METHOD OF OPERATING THE SAME, AND APPARATUS INCLUDING THE OPTICAL MODULATION DEVICE

CROSS-REFERENCE TO RELATED APPLICATION

This application is based on and claims priority under 35 U.S.C. § 119 to Korean Patent Application No. 10-2018-0108527, filed on Sep. 11, 2018, in the Korean Intellectual Property Office, the disclosure of which is incorporated herein in its entirety by reference.

BACKGROUND

1. Field

The disclosure relates to an optical modulation device, a method of operating the optical modulation device, and an apparatus including the optical modulation device.

2. Description of the Related Art

Optical devices that change transmission/reflection properties, a phase, an amplitude, polarization, strength, passage, and the like of light are used in various optical apparatuses. Optical modulators having various structures have been introduced to control the above-mentioned properties of light in a desired manner within an optical system.

For example, to steer a laser to a target position, an irradiated portion of the laser may be mechanically rotated, or interference of a plurality of lasers in an optical phased array (OPA) method may be used. However, to mechanically steer the laser, a motor structure or a microelectromechanical system (MEMS) structure is needed, and in this case, the apparatuses come to have greater volumes and higher costs. In addition, a motor may cause noise, and a MEMS structure may cause issues such as vibration. Accordingly, application of the above-mentioned structures is limited. For the OPA method, for electric or thermal driving, a driving device is required for each pixel or waveguide, and thus, circuits and devices may have complicated structures, increased sizes, and increased process prices.

Recently, there have been attempts to use a nano structure, in which a surface plasmon resonance phenomenon is used with respect to incident light, in optical devices.

SUMMARY

Provided is an optical modulation device for non-mechanically modulating light, thereby simplifying a configuration of a driving circuit unit, decreasing pixel sizes, and widening a field of view (FOV).

Provided is a method of operating the optical modulation device.

Provided is an optical apparatus including the optical modulation device.

In accordance with an aspect of the disclosure, an optical modulation device includes: a mirror array including a plurality of mirror elements, wherein at least some of the plurality of mirror elements have different refractive indices; a nano-antenna array disposed opposite the mirror array and including a plurality of nano-antennas; and an active layer disposed between the mirror array and the nano antenna array, the active layer having physical properties changed according to electric conditions.

The at least some of the plurality of mirror elements may include different materials.

The at least some of the plurality of mirror elements may include different dopants.

The at least some of the plurality of mirror elements may have different doping concentrations.

The at least some of the plurality of mirror elements may have different refractive indices while including the same material.

The optical modulation device may further include a plurality of heating elements respectively contacting the plurality of mirror elements.

The plurality of mirror elements may be arranged in a first direction, and refractive indices of the plurality of mirror elements may increase stepwise in the first direction.

The optical modulation device may further include at least one of a first insulating layer disposed between the mirror array and the active layer; and a second insulating layer disposed between the active layer and the nano-antenna array.

The optical modulation device may further include at least one of: a first voltage applying unit configured to equally apply a first voltage to the plurality of mirror elements; and a second voltage applying unit configured to equally apply a second voltage to the plurality of nano-antennas.

The active layer may include an electro-optic material which has a permittivity changed in response to an electric signal applied to the electro-optic material.

The active layer may include at least one of a transparent conductive oxide and a transition metal nitride.

The optical modulation device may be configured to derive phase modulation of light reflected by the nano-antenna.

In accordance with an aspect of the disclosure, an optical apparatus including the above-mentioned optical modulation device is provided.

The optical apparatus may be configured to one-dimensionally or two-dimensionally steer a beam by using the optical modulation device.

The optical apparatus may, for example, include at least one of a Light Detection And Ranging (LiDAR) apparatus, a three-dimension image acquisition apparatus, a three-dimension sensor, and a depth sensor.

In accordance with an aspect of the disclosure, a method of operating the above-mentioned optical modulation device includes modulating light incident on the optical modulation device, wherein the modulating of the light incident on the optical modulation device includes equally applying a voltage in a first same condition to pixel regions corresponding to the mirror elements having the different refractive indices in the optical modulation device.

The equally applying of n to the pixel regions may include applying a same voltage to the mirror elements respectively having the different refractive indices.

The equally applying of the voltage in the first same condition to the pixel regions may further include applying a same voltage to nano-antennas, from among the plurality of nano-antennas, corresponding to the mirror elements respectively having the different refractive indices.

The equally applying of the voltage in the first same condition to the pixel regions may include: equally applying a first voltage to the mirror elements respectively having different refractive indices from among the plurality of mirror elements; and equally applying a second voltage to nano-antennas, from among the plurality of nano-antennas, corresponding to the mirror elements respectively having the different refractive indices.

The modulating of the light incident on the optical modulation device may further include equally applying a voltage of a second same condition to pixel regions that correspond to the mirror elements respectively having the different refractive indices in the optical modulation device.

In accordance with an aspect of the disclosure, an optical modulation device includes a mirror array comprising a plurality of mirror elements corresponding to a plurality of pixel regions, wherein a first refractive index of a first mirror element from among the plurality of mirror elements is different from a second refractive index of a second mirror element from among the plurality of mirror elements; a nano-antenna array disposed facing the mirror array, the nano-antenna array comprising a plurality of nano-antennas; and an active layer disposed between the mirror array and the nano-antenna array, the active layer having physical properties that change according to electric conditions.

A material of the first mirror element may be different from a material of the second mirror element.

The first mirror element may include a first dopant and the second mirror element may include a second dopant different from the first dopant.

The first mirror element may have a first doping concentration and the second mirror element may have a second doping concentration different from the first doping concentration.

The first mirror element may include a same material as the second mirror element.

The optical modulation device may further include a plurality of heating elements respectively contacting the plurality of mirror elements.

The plurality of mirror elements may be arranged in a first direction, and refractive indices of the plurality of mirror elements may increase stepwise in the first direction.

The optical modulation device may further include at least one from among a first insulating layer disposed between the mirror array and the active layer; and a second insulating layer disposed between the active layer and the nano-antenna array.

The optical modulation device may further include at least one from among a first voltage applying unit configured to apply a first voltage to the plurality of mirror elements; and a second voltage supplying unit configured to apply a second voltage to the plurality of nano-antennas.

The active layer may include an electro-optic material that has a permittivity that changes in response to an electric signal applied to the electro-optic material.

The active layer may include at least one from among a transparent conductive oxide and a transition metal nitride.

The optical modulation device may be configured to modulate a phase of light reflected by the nano-antennas by changing the physical properties of the active layer according to the electric conditions.

The optical modulation device may constitute an optical apparatus.

The optical modulation device may be configured to one-dimensionally or two-dimensionally steer a beam.

The optical apparatus may further include at least one from among a LiDAR apparatus, a three-dimensional image acquisition apparatus, a three-dimension sensor, and a depth sensor.

In accordance with an aspect of the disclosure, a method of operating the optical modulation device may include modulating light incident on the optical modulation device, wherein the modulating of the light incident on the optical modulation device includes applying a uniform voltage to the plurality of pixel regions that correspond to the plurality of mirror elements such that the uniform voltage is applied to a first pixel region corresponding to the first mirror element and such that the uniform voltage is applied to a second pixel region corresponding to the second mirror element.

The applying of the uniform voltage to the plurality of pixel regions may include applying a first voltage to the plurality of mirror elements.

The applying of the uniform voltage to the plurality of pixel regions may include applying a second voltage to nano-antennas, from among the plurality of nano-antennas, corresponding to the plurality of mirror elements.

The applying of the uniform voltage to the plurality of pixel regions may further include applying a first voltage to the plurality of mirror elements; and applying a second voltage to nano-antennas, from among the plurality of nano-antennas, corresponding to the plurality of mirror elements.

The modulating of the light incident on the optical modulation device may further include applying a second uniform voltage to the plurality of pixel regions that correspond to the plurality of mirror elements.

BRIEF DESCRIPTION OF THE DRAWINGS

These and other aspects, features, and advantages of certain embodiments of the disclosure will be more apparent from the following description taken in conjunction with the accompanying drawings, in which.

DETAILED DESCRIPTION

Figure 1:
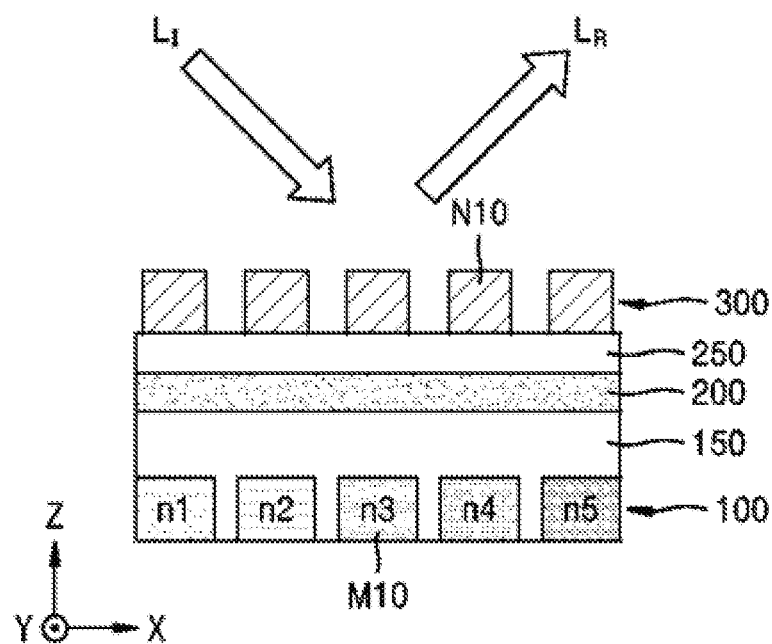
FIG. 1 is a cross-sectional view illustrating an optical modulation device according to an embodiment.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, an optical modulation device according to embodiments, a method of operating the optical modulation device, and an apparatus including the optical modulation device will be described in detail with reference to the attached drawings. Widths and thicknesses of layers or regions illustrated in the attached drawings may be exaggerated for clarity of the specification and convenience of explanation. Throughout the detailed description, same reference numbers denote same elements.

FIG. 1 is a cross-sectional view illustrating an optical modulation device according to an embodiment.

Referring to FIG. 1, a mirror array 100 including a plurality of mirror elements M10 respectively corresponding to a plurality of pixel regions may be provided in the optical modulation device. Opposite the mirror array 100, a nano-antenna array 300 including a plurality of nano-antennas N10 may be provided in the optical modulation device. The plurality of nano-antennas N10 may be disposed to respectively correspond to the plurality of pixel regions. Accordingly, the plurality of nano-antennas N10 may correspond one-to-one to the plurality of mirror elements M10. An active layer 200 having physical properties changed according to electrical conditions may be provided between the mirror array 100 and the nano-antenna array 300. In addition, a first insulating layer 150 may be provided between the mirror array 100 and the active layer 200, and a second insulating layer 250 may be provided between the active layer 200 and the nano-antenna array 300.

The plurality of mirror elements M10 may be back reflector electrodes arranged below the active layer 200. In other words, the plurality of mirror elements M10 may function as electrodes while reflecting light. The plurality of mirror elements M10 may be optically coupled to the plurality of nano-antennas N10, and light may be reflected by an optical interaction between the plurality of nano-antennas N10 and the plurality of mirror elements M10. The mirror elements M10 may include a certain conductive material such as a metal. For example, the mirror element M10 may include at least one kind of metal from among copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), gold (Au), and molybdenum (Mo), or include an alloy including at least one of the above-mentioned metals. Alternatively, the mirror elements M10 may each include a thin film in which metal nanoparticles such as Au and Ag are scattered, a carbon nano structure such as graphene or carbon nanotube (CNT), a conductive polymer such as poly(3,4-ethylenedioxythiophene) (PEDOT), polypyrrole (PPy), poly(3-hexylthiophene) (P3HT), or may also include a conductive oxide.

The plurality of mirror elements M10 may have different refractive indices. In FIG. 1, n1, n2, n3, n4, and n5 in the plurality of mirror elements M10 indicate refractive indices of the mirror elements M10. When the refractive indices of the plurality of mirror elements M10 are referred to as complex indices, real parts n of the complex indices of the plurality of mirror elements M10 may be different from one another. Imaginary parts k of the complex indices of the plurality of mirror elements M10 may be identical to or different from one another. When the plurality of mirror elements M10 are arranged apart from one another in a first direction, the refractive indices of the plurality of mirror elements M10 may increase in the first direction or in a reverse direction of the first direction. The refractive indices of the plurality of mirror elements M10 may, for example, be in a range from about 1.1 to about 2.5 or a range from about 1.2 to about 1.9, but the range of the refractive indices of the plurality of mirror elements M10 is not limited thereto.

The plurality of mirror elements M10 may respectively include different materials; and thus, the refractive indices of the plurality of mirror elements M10 may be different from one another. In this case, the plurality of mirror elements M10 may include different metal materials. Alternatively, the plurality of mirror elements M10 may include different dopants, and thus, the refractive indices of the plurality of mirror elements M10 may be different from one another. In this case, the plurality of mirror elements M10 may include different dopants while including one same base material (for example, a metal). For example, doping concentrations of the plurality of mirror elements M10 may be different from one another, and thus, the refractive indices of the plurality of mirror elements M10 may be different from one another. In this case, the plurality of mirror elements M10 may have different doping concentrations while having one same base material (for example, a metal). Alternatively, the plurality of mirror elements M10 may have different refractive indices while including the same material. Details thereof will be further described later with reference to FIG. 9.

The nano-antenna N10 converts light (including incident light, visible or invisible electromagnetic waves) of a certain wavelength (or a frequency) to a localized surface plasmon resonance and captures energy generated from the conversion; that is, the nano-antenna N10 may be a nano-structure type antenna with respect to light. The nano-antenna N10 may include a conductive layer pattern (for example, a metal layer pattern) and the conductive layer pattern may contact a non-conductive layer (for example, a dielectric layer). A plasmon resonance may occur in an interface between the conductive layer pattern and the non-conductive layer (for example, the dielectric layer). In this case, the non-conductive layer (for example, the dielectric layer) may be the second insulating layer 250 or a layer independent from the second insulating layer 250. For convenience of explanation, the conductive layer pattern is considered as the nano-antenna N10 and described in detail. Interfaces in which a surface plasmon resonance occurs, like the interface between the conductive layer pattern and the non-conductive layer (for example, the dielectric layer), may be collectively referred to as "meta surfaces" or "meta structures".

The nano-antenna N10 may include a conductive material and may have a sub-wavelength size. Here, the sub-wavelength size is a size smaller than an operation wavelength of the nano-antenna N10; i.e., a wavelength of light that the nano-antenna N10 is designed to receive. Any physical dimension regarding the form of the nano-antenna N10, for example, at least one of a thickness, a horizontal length, a vertical length, or an interval between the nano-antennas N10 may have the sub-wavelength size. A resonance wavelength may vary according to the form or the size of the nano-antenna N10.

The conductive material included in the nano-antenna N10 may include a highly conductive metal material in which surface plasmon excitation may occur. For example, the conductive material may include at least one metal from among Cu, Al, Ni, Fe, Co, Zn, Ti, Ru, Rh, Pd, Pt, Ag, Os, Ir, Au, Mo, or an alloy including at least one of the above-mentioned metals. Alternatively, the nano-antenna N10 may include a thin film in which metal nanoparticles such as Au and Ag are scattered, a carbon nano structure such as graphene or a CNT, a conductive polymer such as PEDOT, PPy, and P3HT, or may also include a conductive oxide.

The active layer 200 may be a layer having physical properties changed according to electric conditions of the active layer 200. According to electric conditions related to the active layer 200 and a peripheral region thereof, a permittivity or a refractive index of the active layer 200 may be changed. Changes in the permittivity/refractive index of the active layer 200 may result from changes in a charge concentration (a charge density) in region(s) in the active layer 200. In other words, the permittivity/refractive index of the active layer 200 may be changed according to change in the charge concentration of the region(s) in the active layer 200. The permittivity/refractive index of the active layer 200 may be changed according to an electric field or a voltage applied to the active layer 200. The active layer 200 may, for example, include a transparent conductive oxide (TCO) such as indium tin oxide (ITO), indium zinc oxide (IZO), aluminum zinc oxide (AZO), gallium zinc oxide (GZO), aluminum gallium zinc oxide (AGZO), and gallium indium zinc oxide (GIZO). Alternatively, the active layer 200 may include a transition metal nitride (TMN) such as TiN, ZrN, HfN, and TaN. Furthermore, the active layer 200 may include an electro-optic (EO) material having an effective permittivity that is changed when an electric signal is applied to the EO material. The EO material may, for example, include a crystalline material such as lithium niobate ($LiNbO_3$), lithium tantalate ($LiTaO_3$), potassium tantalate niobate (KTN), or lead zirconate titanate (PZT), or may include various kinds of polymers having electro-optical properties. The active layer 200 may be a conductor or a semiconductor.

Each of the first insulating layer 150 and the second insulating layer 250 may include an insulating material (a dielectric material). The first insulating layer 150 and the second insulating layer 250 may each have an electric resistance of about at least 1 MΩ. At least one of the first insulating layer 150 and the second insulating layer 250 may include at least one of an insulating silicon compound and an insulating metal compound. The insulating silicon compound may, for example, include silicon oxide (SiOx), silicon nitride (SixNy), silicon oxynitride (SiON), and the like; the insulating metal compound may, for example, include aluminum oxide ($Al_2O_3$), hafnium oxide (HfO), zirconium oxide (ZrO), hafnium silicon oxide (HfSiO), and the like. However, the above-mentioned materials included in the first insulating layer 150 and the second insulating layer 250 are only examples and the present embodiment is not limited thereto. The first insulating layer 150 and the second insulating layer 250 may include the same material or different materials.

The active layer 200 may be electrically separated (insulated) from the plurality of mirror elements M10 by the first insulating layer 150 and may be electrically separated (insulated) from the plurality of nano-antennas N10 by the second insulating layer 250. Due to a voltage applied between the plurality of mirror elements M10 and the active layer 200 and/or a voltage applied between the plurality of nano-antennas N10 and the active layer 200, a physical property (such as the refractive index) of the active layer 200 may be changed. When certain incident light $L_I$ is reflected by the plurality of nano-antennas N10, a property (a direction) of reflected light $L_R$ may be changed according to the physical property of the active layer 200. When the physical property of the active layer 200 is changed by using a voltage applied to the plurality of mirror elements M10 and a voltage applied to the plurality of nano-antennas N10, an optical modulation property may be improved and noise may be reduced.

Figure 2:
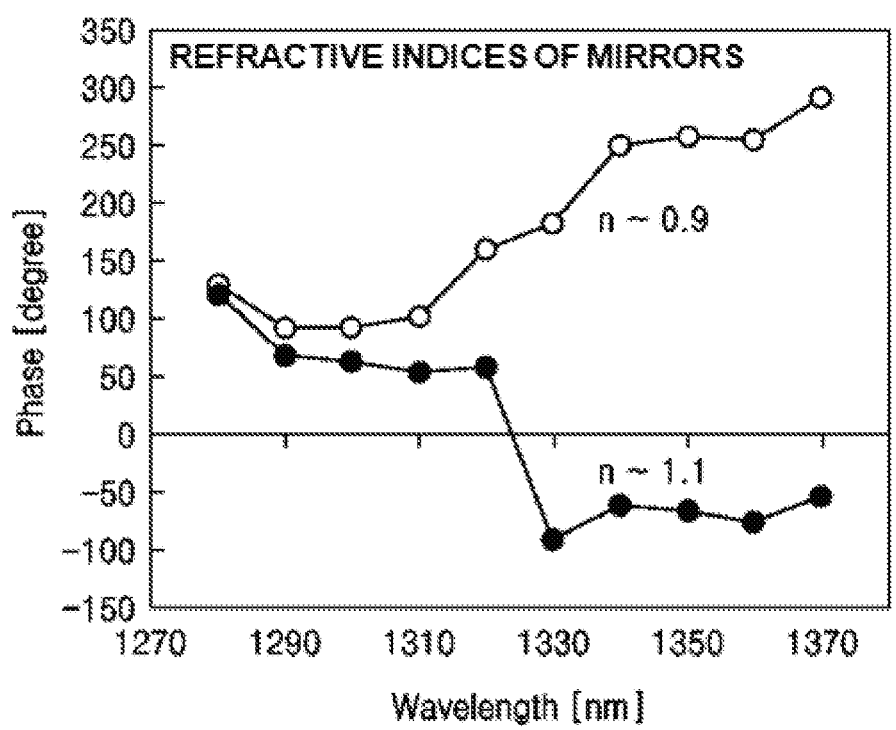
FIG. 2 is a graph illustrating changes in reflection phases according to refractive indices of mirror elements, according to an embodiment.

FIG. 2 is a graph illustrating changes in reflection phases according to refractive indices of the plurality of mirror elements M10.

Referring to FIG. 2, when the refractive indices of the plurality of mirror elements M10 are different from one another, reflection phases based on the refractive indices may be different from one another. Accordingly, when a plurality of mirrors having a different refractive index for each pixel are formed and when the active layer 200 has a same refractive index in each pixel, a different phase (a reflection phase) may be embodied for each pixel due to gaps between the refractive indices of the plurality of mirrors. In FIG. 2, the relationship between reflected light wavelength and reflected light phase is shown for mirrors having indices of refraction of 0.9 and 1.1, respectively.

Figure 3:
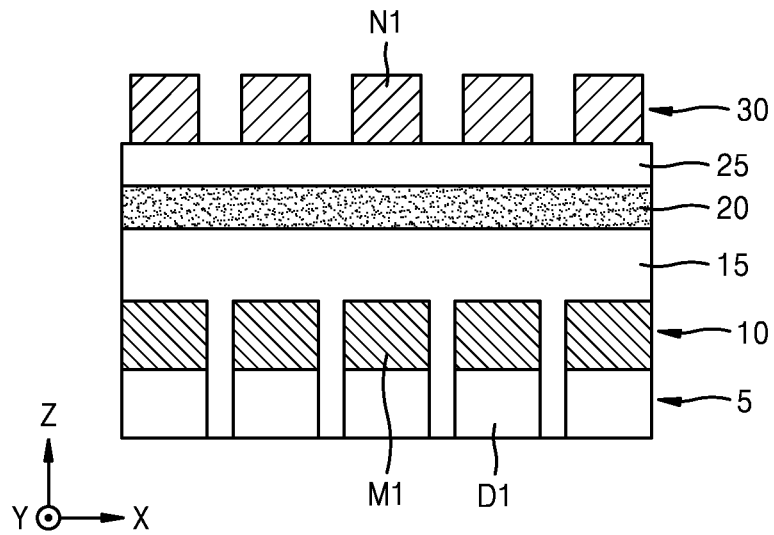
FIG. 3 is a cross-sectional view illustrating an optical modulation device according to a comparative example.

FIG. 3 is a cross-sectional view illustrating an optical modulation device according to a comparative example.

Referring to FIG. 3, the optical modulation device according to the comparative example includes a mirror array 10 including a plurality of mirror elements M1 and a nano-antenna array 30 including a plurality of nano-antennas N1 that are opposite the plurality of mirror elements M1. In addition, in the optical modulation device, a driving device unit 5 including a plurality of pixel driving units D1 respectively connected to the plurality of mirror elements M1 is provided. Although it is not shown in FIG. 3, the plurality of pixel driving units D1 may also be connected to the plurality of nano-antennas N1. Here, the plurality of mirror elements M1 may include the same material and have the same refractive index. Reference number 15 indicates a first insulating layer, reference number 20 indicates an active layer, and reference number 25 indicates a second insulating layer.

By applying different voltages respectively to the plurality of mirror elements M1 by using the plurality of pixel driving units D1 and by applying different voltages respectively to the plurality of nano-antennas N1, a plurality of regions in the active layer 20 respectively corresponding to the plurality of pixel regions may be differently controlled; and as a result, a beam steering property according to a phase profile may be implemented. However, in such comparative examples, different voltages are respectively applied to pixels, and accordingly, a driving circuit and a device structure may be complicated. In addition, to two-dimensionally steer a beam, each pixel needs a driving unit D1 and thus, a pixel size increases and a field of view (FOV) decreases.

Figure 4:
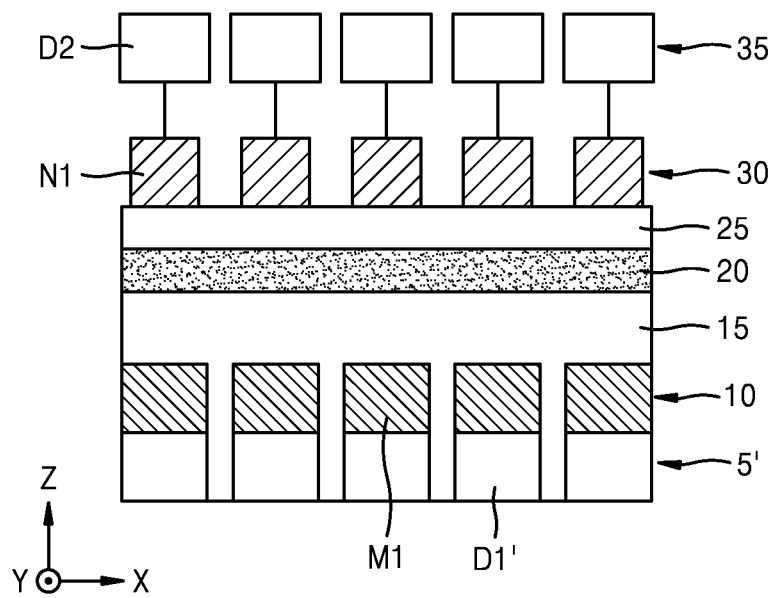
FIG. 4 is a cross-sectional view illustrating an optical modulation device according to a comparative example.

FIG. 4 is a cross-sectional view illustrating an optical modulation device according to another comparative example.

Referring to FIG. 4, in the comparative example, the optical modulation device includes a first driving device unit 5' including a plurality of first driving units D1' respectively connected to the plurality of mirror elements M1 and a second driving device unit 35 including a plurality of second driving units D2 respectively connected to the plurality of nano-antennas N1. Different voltages may be applied respectively to the plurality of mirror elements M1 by the plurality of first driving units D1', and different voltages may be respectively applied to the plurality of nano-antennas N1 by the plurality of second driving units D2. However, in such comparative examples, different voltages are respectively applied to pixels, and accordingly, structures of a driving circuit and a device become complicated, a pixel size increases, and an FOV decreases.

Figure 5:
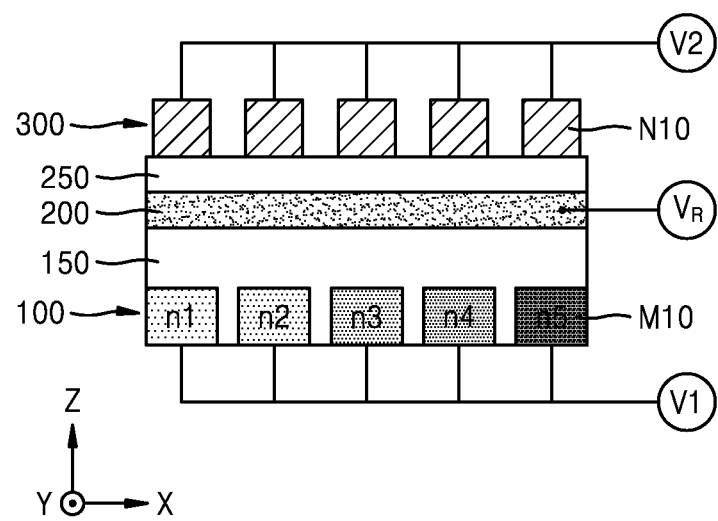
FIG. 5 is a cross-sectional view illustrating a case in which a signal applying unit for applying an electric signal is connected to an optical modulation device, according to an embodiment.

FIG. 5 is a cross-sectional view illustrating a case in which signal applying units for applying electric signals are connected to an optical modulation device, according to an embodiment.

Referring to FIG. 5, the optical modulation device according to the present embodiment may include a first voltage applying unit V1 connected in common to the plurality of mirror elements M10 and may further include a second voltage applying unit V2 connected to the plurality of nano-antennas N10 in common. A first voltage may be equally applied to the plurality of mirror elements M10 by using the first voltage applying unit V1 and a second voltage may be equally applied to the plurality of nano-antennas N10 by using the second voltage applying unit V2. $V_R$ connected to the active layer 200 indicates a reference voltage applied to the active layer 200. The reference voltage $V_R$ may be a ground voltage or a certain constant voltage.

Figure 6:
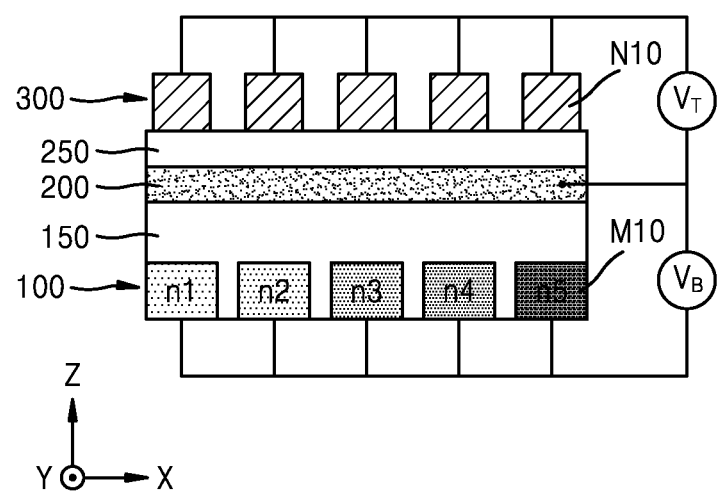
FIG. 6 is a cross-sectional view illustrating a case in which a signal applying unit for applying an electrical signal is connected to an optical modulation device, according to an embodiment.

FIG. 6 is a cross-sectional view of a case in which signal applying units for applying electric signals are connected to an optical modulation device, according to another embodiment.

Referring to FIG. 6, the optical modulation device according to the present embodiment may include a first voltage applying unit $V_B$ connected between the plurality of mirror elements M10 and the active layer 200, and may further include a second voltage applying unit $V_T$ between the plurality of nano-antennas N10 and the active layer 200. A first voltage may be equally applied to the plurality of mirror elements M10 by using the first voltage applying unit $V_B$ with respect to the active layer 200, and a second voltage may be equally applied to the plurality of nano-antennas N10 by using the second voltage applying unit $V_T$ with respect to the active layer 200. A ground voltage or a certain constant voltage may be applied to the active layer 200.

Figure 7A:
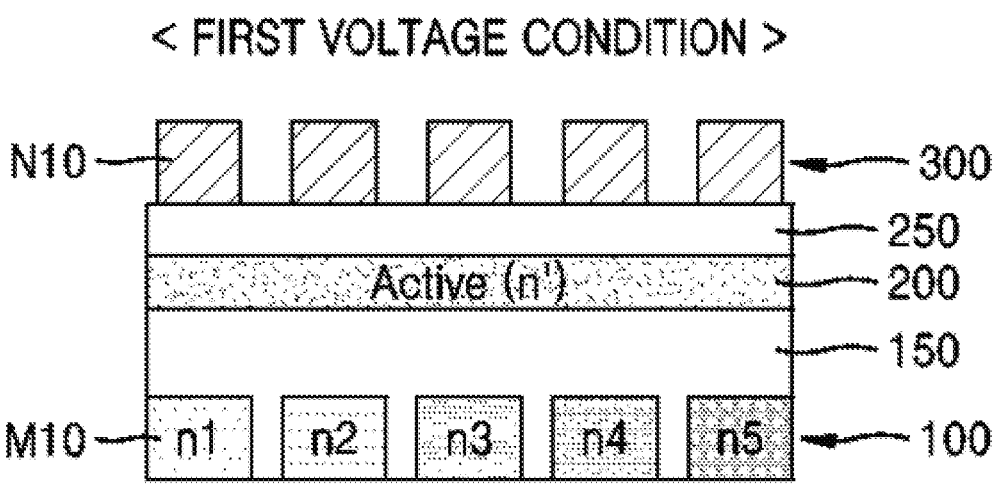
FIGS. 7A and 8A are cross-sectional views illustrating optical modulation devices according to embodiments.
Figure 7B:
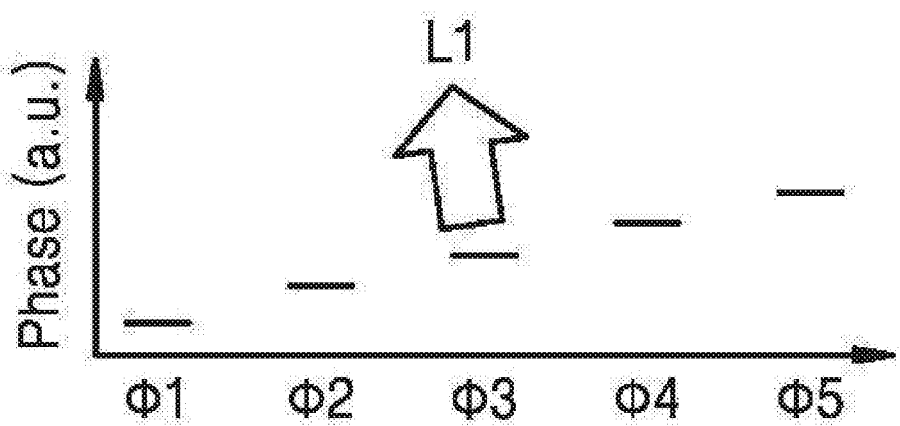
FIGS. 7B and 8B are graphs illustrating phase changes in the plurality of pixels according to embodiments.
Figure 8A:
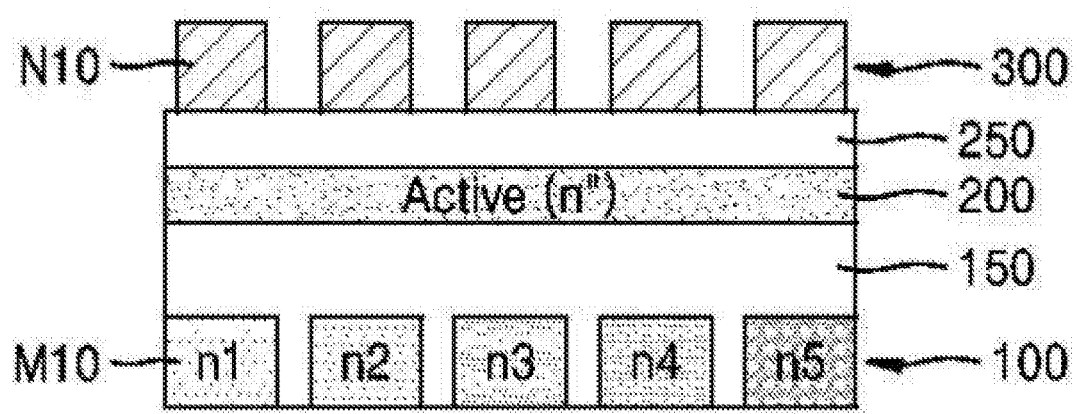
Figure 8B:
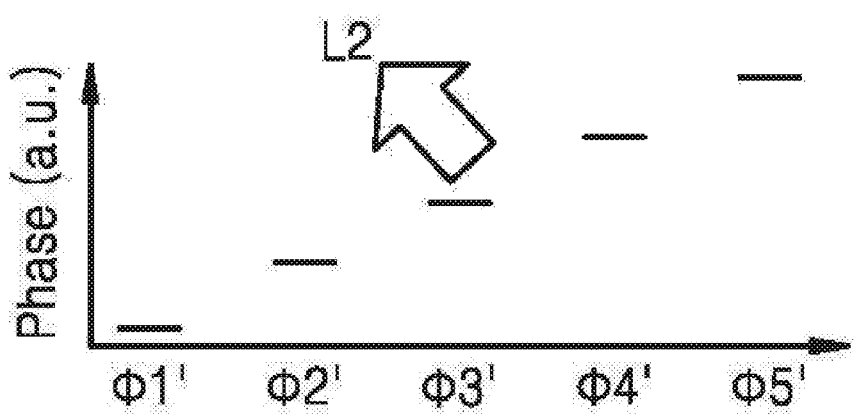

FIGS. 7A, 7B, 8A, and 8B illustrate a principle of change in a direction of light reflected (modulated) by an optical modulation device, according to embodiments; FIGS. 7A and 7B illustrate a case in which a voltage of a first same condition is equally applied to the plurality of pixel regions in the optical modulation device; and FIGS. 8A and 8B illustrate a case in which a voltage of a second same condition is equally applied to the plurality of pixel regions in the optical modulation device. FIGS. 7A and 8A illustrate a structure of the optical modulation device, and FIGS. 7B and 8B illustrate a phase change in the plurality of pixels. Here, the first same condition may include a condition in which a uniform voltage is applied to either or both of the mirror array and the nano-antenna array such that a specific voltage is applied to the plurality of pixel regions. The uniform voltage applied to the mirror array may be the same as or different from the uniform voltage applied to the nano-antenna array. Similarly, the second same condition may include a condition in which a uniform voltage is applied to either or both of the mirror array and the nano-antenna array such that a specific voltage is applied to the plurality of pixel regions that is different from the specific voltage of the first same condition. The uniform voltage applied to the mirror array may be the same as or different from the uniform voltage applied to the nano-antenna array.

Referring to FIGS. 7A and 7B, the voltage of the first same condition may be equally applied to the plurality of pixel regions in the optical modulation device. In other words, the first voltage may be applied equally to all of the plurality of mirror elements M10, and the second voltage may be applied equally to all of the plurality of nano-antennas N10. By doing so, a plurality of regions in the active layer 200, which respectively correspond to the plurality of pixel regions in the optical modulation device, may have a first refractive index n'. In the present embodiment, the refractive indices of the plurality of mirror elements M10 are different from one another, and thus, when a uniform voltage is applied to all of the plurality of mirror elements M10 and another uniform voltage is applied to all of the plurality of nano-antennas N10, phase changes of different types occur in the plurality of pixel regions, and thus, the modulated light L1 may be reflected in the first direction.

Referring to FIGS. 8A and 8B, the voltage of the second same condition may be equally applied to the plurality of pixel regions in the optical modulation device. In other words, a third voltage may be applied equally to all of the plurality of mirror elements M10, and a fourth voltage may be applied equally to all of the plurality of nano-antennas N10. The third voltage may be different from the first voltage, and the fourth voltage may be different from the second voltage. By doing so, a plurality of regions in the active layer 200, which respectively correspond to a plurality of pixel regions in the optical modulation device, may have a second refractive index n". In the plurality of pixel regions, in a degree different from the degree shown in FIGS. 7A and 7B, different phase changes occur. As a result, the modulated light L2 may be reflected in the second direction. Accordingly, the beam may be steered when a uniform voltage is applied to all of the plurality of mirror elements M10 and another uniform voltage is applied to all of the plurality of nano-antennas. N10

When a plurality of mirrors each having a different refractive index for each pixel are formed, when the active layer has a same refractive index in each pixel, a different phase may be implemented for each pixel due to gaps between the refractive indices of the plurality of mirrors. Accordingly, when the refractive index of the active layer is changed by applying a uniform voltage to all pixels, the beam may still be steered. As in the comparative examples shown in FIGS. 3 and 4, a driving circuit for applying different voltages respectively to each one of the pixels is not needed. According to the embodiments, a driving circuit unit may have a more simplified configuration, pixel sizes may be significantly reduced, and the FOV (that is, the angle of steering) may be increased. In addition, a size of the optical modulation device and costs of manufacturing the optical modulation device may also be reduced.

According to an embodiment, the plurality of mirror elements M10 may have different refractive indices while including the same material. In this case, a plurality of heating elements respectively contacting the plurality of mirror elements M10 may be further provided. Details thereof will be further described with reference to FIG. 9.

Figure 9:
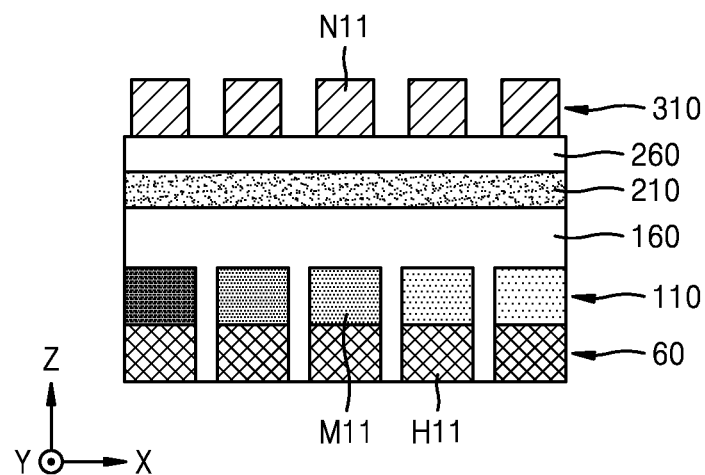
FIG. 9 is a cross-sectional view illustrating an optical modulation device according to an embodiment.

FIG. 9 is a cross-sectional view illustrating an optical modulation device according to another embodiment.

Referring to FIG. 9, the optical modulation device may include a mirror array 110 including a plurality of mirror elements M11 and a nano-antenna array 310 including a plurality of nano-antennas N11 opposite to the plurality of mirror elements M11. In the embodiment, the optical modulation device may further include a plurality of heating elements H11 arranged under the plurality of mirror elements M11. The plurality of heating elements H11 may be considered as being included in a heater array 60. Reference number 160 indicates a first insulating layer, reference number 210 indicates an active layer, and reference number 260 indicates a second insulating layer.

The plurality of mirror elements M11 may include the same material and may have different refractive indices according to heating treatment temperatures. By heating a plurality of material regions including the same material up to different temperatures by using the plurality of heating elements H11, the plurality of mirror elements M11 having different refractive indices may be formed. For example, by using Al doped with Nd (AlNd) as a mirror material, the plurality of mirror elements M11 having a different refractive index for each pixel may be formed. The refractive index of AlNd may be changed according to the heating treatment temperatures. Accordingly, by placing the heater elements H11 under a plurality of AlNd material regions and applying different heating temperatures to the pixels, the refractive indices of the plurality of AlNd mirrors may be different from one another. Here, the heating element H11 may include a metal wiring, and a heating temperature may be changed according to an intensity of a current applied to the metal wiring. In some cases, without applying the heating element H11, after the AlNd material regions are formed, lasers having different energy may be respectively irradiated from outside to the pixels to form a mirror array including pixels respectively having different refractive indices.

Figure 10:
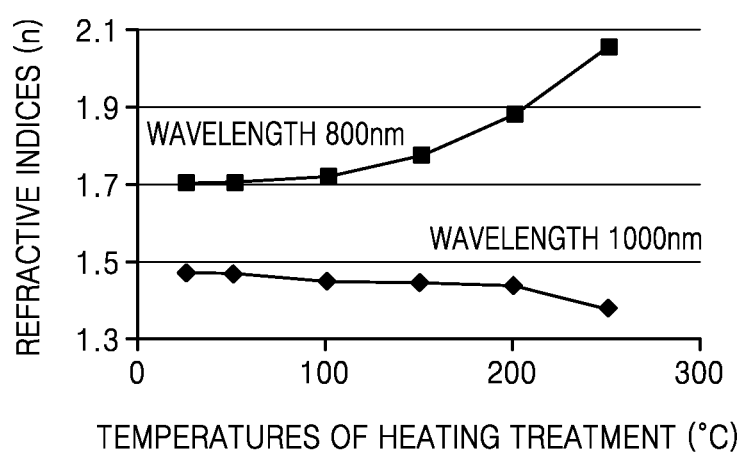
FIG. 10 is a graph illustrating changes in refractive indices according to heating treatment temperatures of AlNd according to an embodiment.

FIG. 10 is a graph illustrating changes in refractive indices according to the heating treatment temperatures of AlNd.

Referring to FIG. 10, according to the heating treatment temperatures of AlNd, the refractive index n may be changed with respect to light having a certain wavelength. As the heating treatment temperature increases, according to wavelengths, the refractive index may increase or decrease. For example, as shown in FIG. 10, the refractive index may increase with increasing temperature for light having a wavelength of 800 nm, and the refractive index may decrease with increasing temperature for light having a wavelength of 1000 nm. By changing the heating treatment temperature of AlNd, the refractive index of the AlNd may be changed. In the present embodiment, AlNd is only used as an example and the mirror material may be variously changed.

Figure 11:
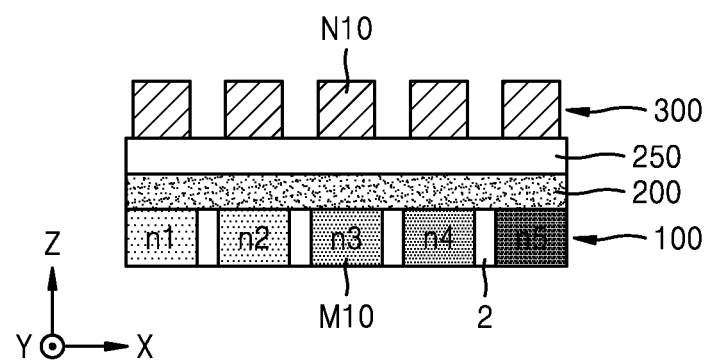
FIG. 11 is a cross-sectional view illustrating an optical modulation device according to an embodiment.

FIG. 11 is a cross-sectional view showing an optical modulation device according to another embodiment.

Referring to FIG. 11, the plurality of mirror elements M10 respectively having different refractive indices may directly contact the active layer 200. In other words, 'the first insulating layer 150' (see FIG. 1) may be omitted between the mirror array 100 and the active layer 200. In this case, an insulating layer (that is, the second insulating layer 250) may be provided between the active layer 200 and the plurality of nano-antennas N10. The active layer 200, the second insulating layer 250, and the nano-antenna N10 may each be considered as including a metal oxide semiconductor (MOS) structure or a structure similar to the MOS structure. Reference number 2 indicates a buried insulating layer filling between the plurality of mirror elements M10.

In the embodiments, the reference voltage may be applied to the active layer 200 and the plurality of mirror elements M10, and a same voltage (an operation voltage) may be applied to the plurality of nano-antennas N10.

Figure 12:
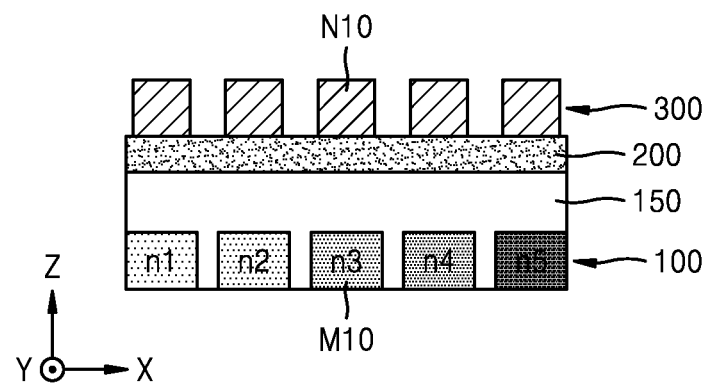
FIG. 12 is a cross-sectional view illustrating an optical modulation device according to an embodiment.

FIG. 12 is a cross-sectional view illustrating an optical modulation device according to another embodiment.

Referring to FIG. 12, the plurality of nano-antennas N10 may directly contact the active layer 200. In other words, 'the second insulating layer 250' (see FIG. 2) may be omitted between the nano-antenna array 300 and the active layer 200. In this case, an insulating layer (that is, the first insulating layer 150) may be provided between the active layer 200 and the plurality of mirror elements M10. The active layer 200, the first insulating layer 150, and the mirror element M10 may be considered as being included in a MOS structure or a structure similar to the MOS structure.

In the present embodiment, the reference voltage may be applied to the active layer 200 and the plurality of nano-antennas N10, and a same voltage (an operation voltage) may be applied to the plurality of mirror elements M10.

Figure 13:
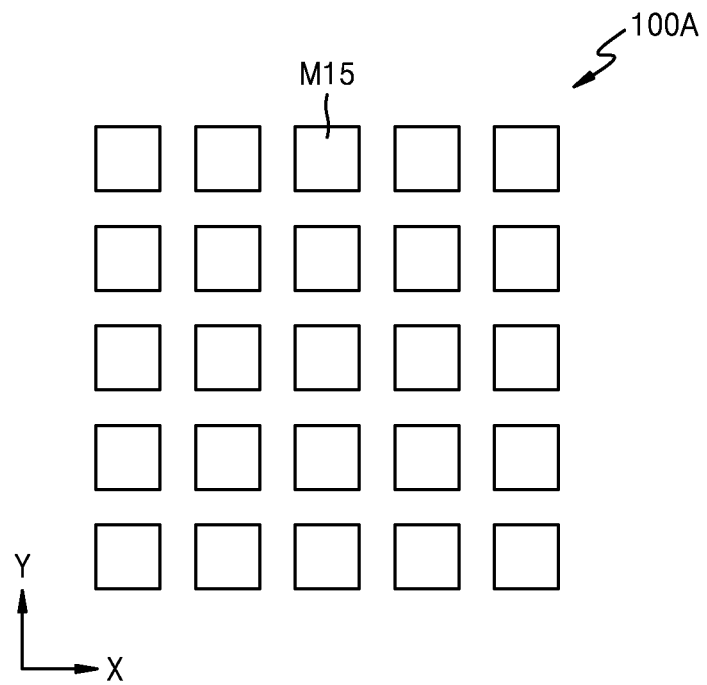
FIG. 13 is a top-plan view illustrating a mirror array that may be adopted in an optical modulation device according to an embodiment.

FIG. 13 is a top-plan view illustrating a mirror array that may be employed in an optical modulation device according to an embodiment.

Referring to FIG. 13, a mirror array 100A including a plurality of mirror elements M15 may be provided. The plurality of mirror elements M15 may have a shape of a dot pattern and be arranged in a plurality of rows and columns in the X axis and the Y axis directions. Each mirror element M15 may have various shapes, for example, a quadrangle, a circle, a polygon, and the like. At least some of the plurality of mirror elements M15 may have different refractive indices. Although it is not shown, a pattern of the nano-antenna opposite the plurality of mirror elements M15 may be similar to the pattern of the plurality of mirror elements M15.

Figure 14:
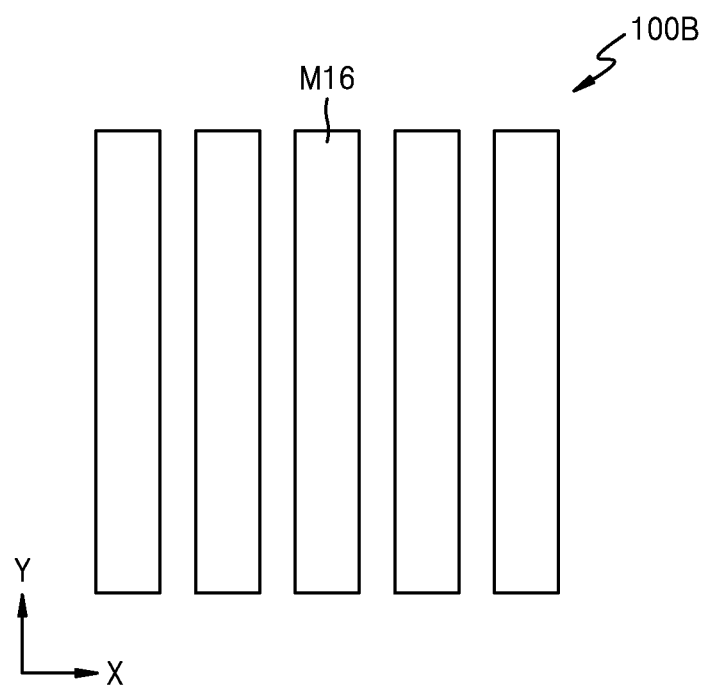
FIG. 14 is a top-plan view illustrating a mirror array that may be adopted in an optical modulation device according to an embodiment.

FIG. 14 is a top-plan view illustrating a mirror array that may be employed in an optical modulation device according to another embodiment.

Referring to FIG. 14, a mirror array 100B including a plurality of mirror elements M16 may be provided. The plurality of mirror elements M16 may each have a line shape. For example, the plurality of mirror elements M16 may extend in the Y axis direction and be arranged apart from one another in the X axis direction. At least some of the plurality of mirror elements M16 may have different refractive indices. Although it is not shown, a plurality of nano-antennas respectively corresponding to the plurality of mirror elements M16 may have a pattern that is similar to a pattern of the plurality of mirror elements M16.

Figure 15:
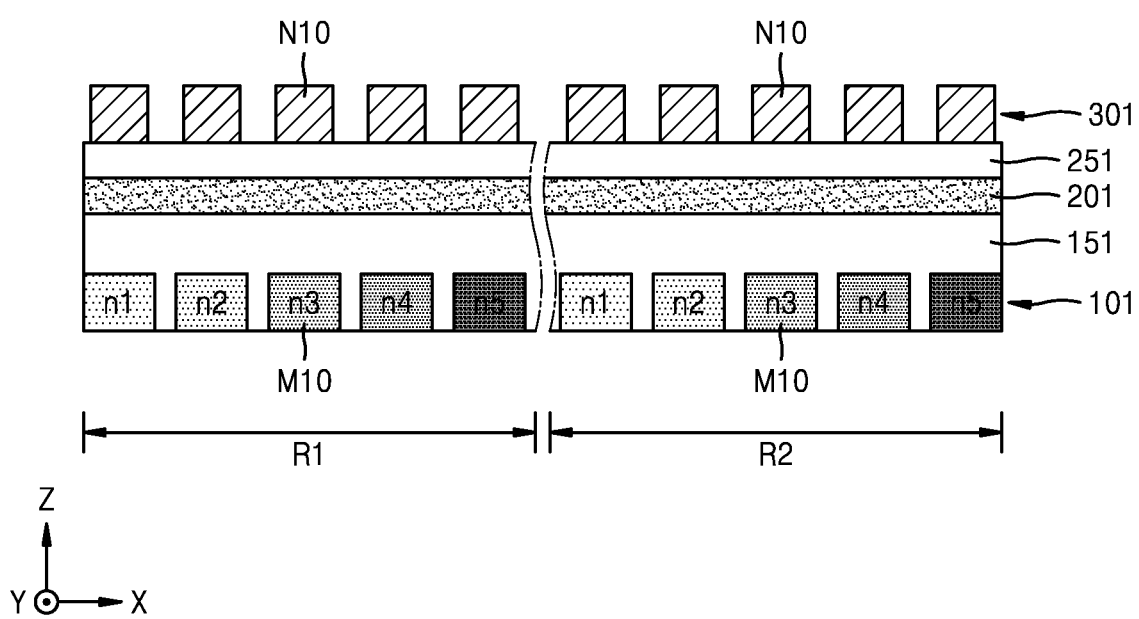
FIG. 15 is a cross-sectional view illustrating an optical modulation device according to an embodiment.

FIG. 15 is a cross-sectional view illustrating an optical modulation device according to another embodiment.

Referring to FIG. 15, the optical modulation device may include a mirror array 101 including a plurality of mirror elements M10, a nano-antenna array 301 including a plurality of nano-antennas N10, a first insulating layer 151, an active layer 201, and a second insulating layer 251 which are placed between the mirror array 101 and the nano-antenna array 301. In addition, the optical modulation device may be divided into a plurality of unit regions. For example, the optical modulation device may include a first unit region R1 and a second unit region R2. The plurality of mirror elements M10 may be placed in the first unit region R1, and refractive indices of the plurality of mirror elements M10 may be different from one another. Similarly, the plurality of mirror elements M10 may be placed in the second unit region R2, and the refractive indexes of the plurality of mirror elements M10 may be different from one another. A structure of the second unit region R2 may substantially be equal or similar to a structure of the first unit region R1. However, the arrangement method shown in FIG. 15 is merely an example, and the arrangement method may be variously modified. In addition, at least three unit regions may be arranged in various methods.

FIGS. 16A, 16B, 16C, and 16D are a group of perspective views illustrating various structures/shapes of a nano-antenna that may be employed in an optical modulation device according to embodiments.

Figure 16A:
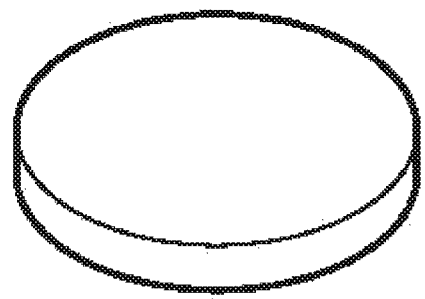
FIGS. 16A, 16B, 16C, and 16D are a group of perspective views illustrating various structures/shapes of a nano-antenna that may be adopted in an optical modulation device according to embodiments.
Figure 16B:
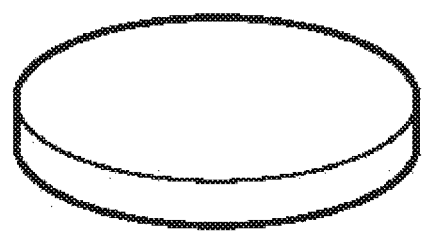
Figure 16C:
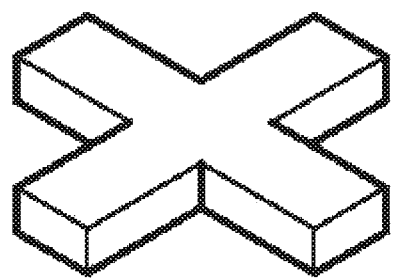
Figure 16D:
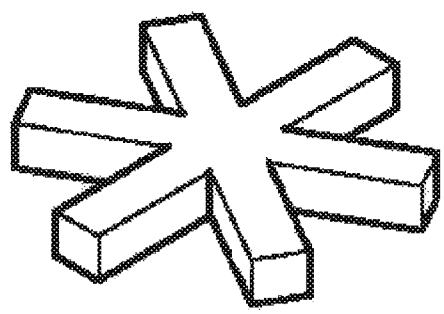

The nano-antenna may have various structures/forms, for example, a round disc as shown in FIG. 16A, an oval disc as shown in FIG. 16B, a cross-type disc as shown in FIG. 16C, an asterisk-type disc as shown in FIG. 16D, and the like. The cross-type disc of FIG. 16C may have a form in which two nanorods cross in directions perpendicular to each other, and the asterisk-type disc of FIG. 16D may have a form of a star (*) including three nanorods that cross one another. In addition, although it is not shown, the nano-antenna may have variously modified structures, for example, a cone structure, a triangular pyramid structure, a sphere structure, a hemisphere structure, a rice grain structure, a rod structure, a fish-bone structure, and the like. In addition, the nano-antenna may have a multi-layered structure including a plurality of layers, or a core-shell structure including a core unit and at least one shell unit. Furthermore, nano-antennas having at least two different structures/forms may be periodically arranged in a unit.

According to the structures/forms and arrangement methods of the nano-antennas, a resonance wavelength, a resonance wavelength width, resonance polarization characteristics, a resonance angle, reflection/absorption/transmission properties, and the like may be changed. Accordingly, by controlling the structures/forms and arrangement methods of the nano-antennas, an optical modulation device having application-specific properties may be manufactured.

By using the optical modulation device according to the embodiments, a device that steers a beam in certain directions (that is, a beam steering device) may be implemented.

Figure 17:
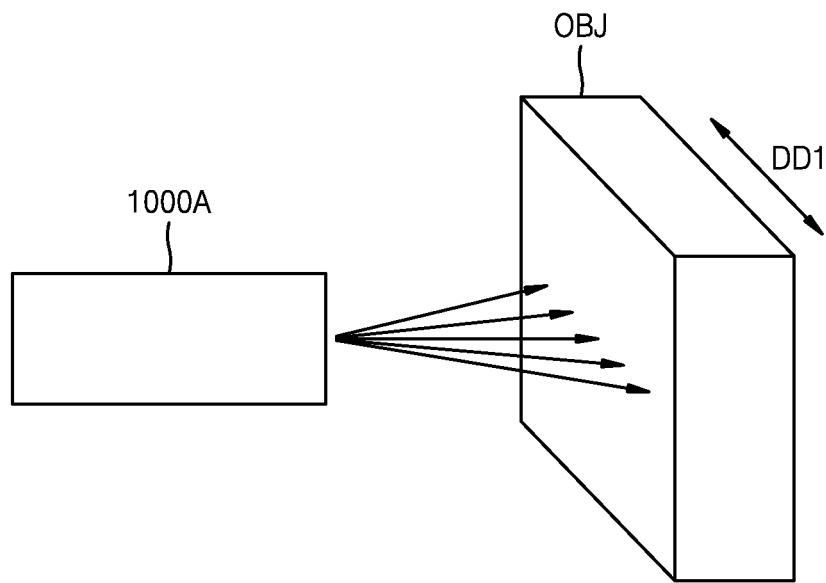
FIG. 17 is a schematic diagram illustrating a beam steering device which includes an optical modulation device according to an embodiment.

FIG. 17 is a schematic diagram illustrating a beam steering device 1000A which includes an optical modulation device according to an embodiment.

Referring to FIG. 17, a beam may be steered in a one-dimensional direction by using the beam steering device 1000A. In other words, the beam may be steered in a first direction DD1 toward an object OBJ. The beam steering device 1000A may include an optical modulation device according to the embodiments of the disclosure.

Figure 18:
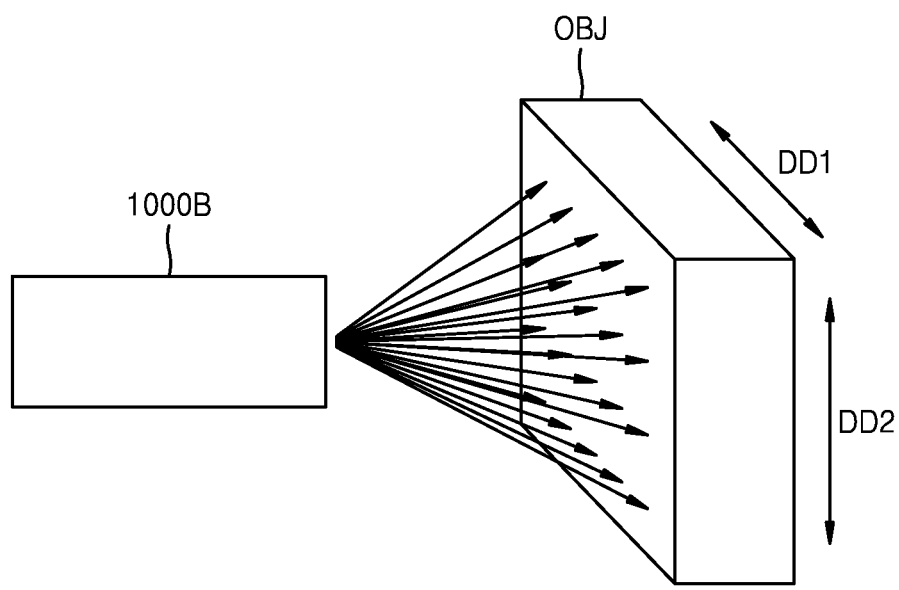
FIG. 18 is a schematic diagram illustrating a beam steering device which includes an optical modulation device according to an embodiment.

FIG. 18 is a schematic diagram illustrating a beam steering device 1000B which includes an optical modulation device according to another embodiment.

Referring to FIG. 18, the beam may be steered in a two-dimensional direction by using the beam steering device 1000B. In other words, the beam may be steered toward the object OBJ according to the first direction DD1 and a second direction DD2 perpendicular to the first direction DD1. The beam steering device 1000B may include an optical modulation device according to the embodiments of the disclosure. The beam steering devices 1000A and 1000B described with reference to FIGS. 17 and 18 may be non-mechanical beam scanning apparatuses.

Figure 19:
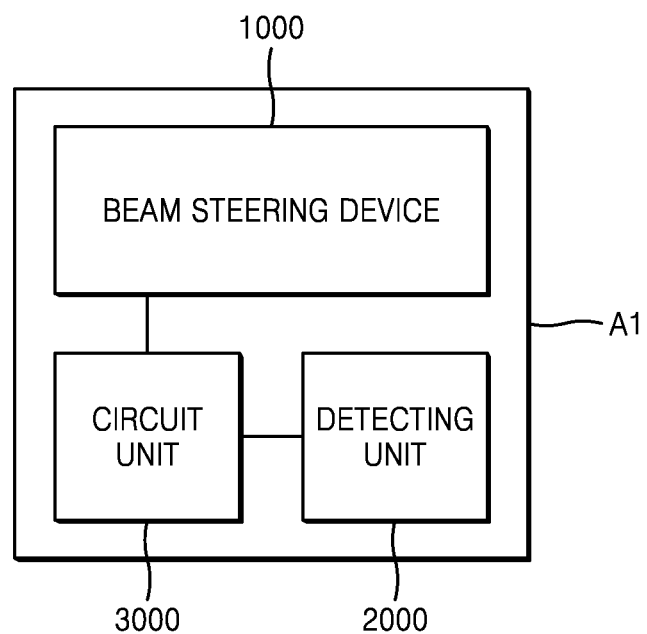
FIG. 19 is a block diagram illustrating an overall system of an optical apparatus which includes a beam steering device adopting an optical modulation device according to an embodiment.

FIG. 19 is a block diagram illustrating an overall system of an optical apparatus A1 which includes a beam steering device using an optical modulation device according to an embodiment.

Referring to FIG. 19, an optical apparatus A1 may include a beam steering device 1000. The beam steering device 1000 may include the optical modulation device described above with references to FIGS. 1 through 5, 16, and the like. The optical apparatus A1 may include a light source unit in the beam steering device 1000 or a light source unit that is provided separately from the beam steering device 1000. The optical apparatus A1 may include a detecting unit 2000 that is used for detecting light that is steered by the beam steering device 1000 and reflected by an object (not shown). The detecting unit 2000 may include a plurality of light detection elements and may further include other optical members. In addition, the optical apparatus A1 may further include a circuit unit 3000 connected to at least one of the beam steering device 1000 and the detecting unit 2000. The circuit unit 3000 may include a calculation unit that acquires data and performs calculations thereon, and may further include a driving unit, a controller, and the like. In addition, the circuit unit 3000 may further include a power unit, a memory, and the like.

FIG. 19 illustrates a case in which the optical apparatus A1 includes the beam steering device 1000 and the detecting unit 2000 in one same apparatus; however, the beam steering device 1000 and the detecting unit 2000 may be separately provided different apparatuses, instead of being provided in one same apparatus. In addition, the circuit unit 3000 may be connected to the beam steering device 1000 or the detecting unit 2000 by wireless communication instead of wired communication. The configuration shown in FIG. 19 may be variously modified.

The beam steering device according to the above-described embodiments may be adopted in various optical apparatuses. For example, the beam steering device may be adopted in a Light Detection And Ranging (LiDAR) apparatus. The LiDAR apparatus may be a phase-shift type apparatus or a time-of-flight type apparatus. The LiDAR apparatus may be applied to an autonomous vehicle, a flying object like a drone, a mobile apparatus, small transportation device (for example, a bicycle, a motorcycle, a perambulator, a skateboard, and the like), robots, supporting tools for humans/animals (for example, a cane, a helmet, accessories, clothing, a watch, a bag), an Internet of Things (IoT) apparatus/system, a security apparatus/system, and the like.

Figure 20:
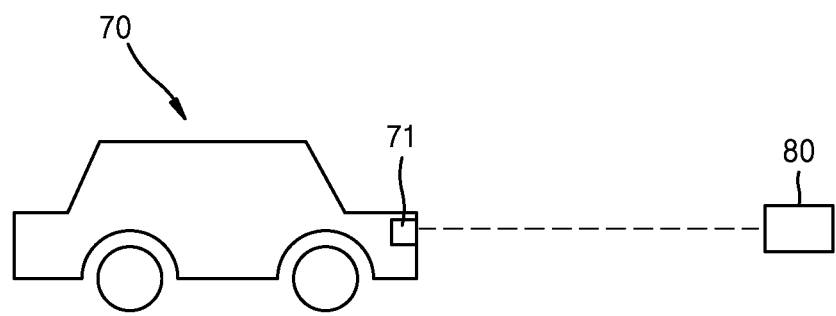
FIGS. 20 and 21 are schematic diagrams each illustrating a case in which a light detection and ranging (LiDAR) apparatus including an optical modulation device according to an embodiment is used in a vehicle.
Figure 21:
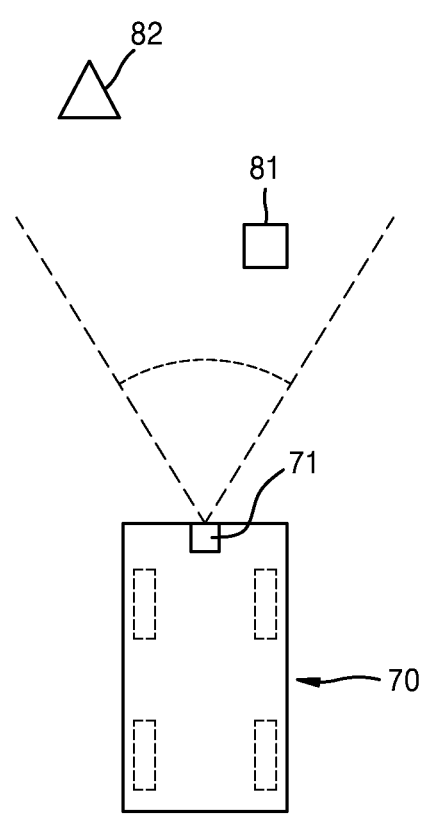

FIGS. 20 and 21 are schematic diagrams illustrating cases in which a LiDAR apparatus including an optical modulation device according to an embodiment is used in a vehicle. FIG. 20 is a drawing taken from a side of the vehicle, and FIG. 21 is a drawing taken from above the vehicle.

Referring to FIG. 20, a LiDAR apparatus 71 may be adopted in a vehicle 70, and data regarding an object 80 may be acquired by using the LiDAR apparatus 71. The vehicle 70 may be an automobile having an autonomous driving function. By using the LiDAR apparatus 71, the object 80, that is, an object or a person existing in a direction in which the vehicle 70 proceeds, may be detected. In addition, a distance from the vehicle 70 to the object 80 may be measured by using data such as a time gap between a transmission signal and a detected signal. In addition, as shown in FIG. 21, data regarding an object 81 near the vehicle 70 within a scanning range and data regarding an object 82 far from the vehicle 70 may be obtained.

In addition to being adopted in a LiDAR apparatus, the optical modulation device according to various embodiments of the disclosure may be adopted in various other optical apparatuses. For example, as the optical modulation device according to various embodiments may be used for acquiring three-dimensional data regarding a space and an object, the optical modulation device may be employed in a 3D image acquisition apparatus, a three-dimensional camera, or the like. In addition, the optical modulation device may also be employed in a holographic display apparatus or a structured light generation apparatus. The optical modulation device may also be applied to various optical components/apparatuses, for example, various beam scanning apparatuses, a hologram generation apparatus, an optical coupling apparatus, a variable focus lens, a depth sensor, and the like. The optical modulation device may also be employed in various technical fields using "a meta surface" or "a meta structure". In addition, the optical modulation device and the apparatus including the same, according to the disclosure, may be employed in various optic and electronics fields for various purposes.

Although many features were described in detail in the detailed description, it will be understood that the above-described embodiments will be considered in a descriptive sense only and not for purposes of limitation. For example, one of ordinary skill in the art may understand that the configuration of the optical modulation device described with reference to FIGS. 1 and 5 through 21 may be variously modified. As a detailed example, the nano-antennas and the mirror elements may not correspond to one another in one-to-one. In addition, the disclosure may also be applied to a case in which one optical modulation device includes a plurality of layers (that is, a plurality of active layers apart from one another and stacked). In addition, application fields of the optical modulation device according to the embodiments are not limited to what is described above and may be variously changed. Accordingly, the scope of the disclosure is defined not by the detailed descriptions but by the technical spirit of the appended claims.

What is claimed is:
1. An optical modulation device comprising:
a mirror array comprising a plurality of mirror elements corresponding to a plurality of pixel regions, wherein a first refractive index of a first mirror element from among the plurality of mirror elements is different from a second refractive index of a second mirror element from among the plurality of mirror elements;

a nano-antenna array disposed facing the mirror array, the nano-antenna array comprising a plurality of nano-antennas; and an active layer disposed between the mirror array and the nano-antenna array, the active layer having physical properties that change according to electric conditions, wherein light having a first phase that is incident on the first mirror element is reflected by the first mirror element toward the active layer at a second phase, and wherein the light having the first phase that is incident on the second mirror element is reflected by the second mirror element toward the active layer at a third phase different from the second phase.

2. The optical modulation device of claim 1,
wherein a material of the first mirror element is different from a material of the second mirror element.

3. The optical modulation device of claim 1,
wherein the first mirror element comprises a first dopant and the second mirror element comprises a second dopant different from the first dopant.

4. The optical modulation device of claim 1,
wherein the first mirror element has a first doping concentration and the second mirror element has a second doping concentration different from the first doping concentration.

5. The optical modulation device of claim 1,
wherein the first mirror element comprises a same material as the second mirror element.

6. The optical modulation device of claim 1, further comprising a plurality of heating elements respectively contacting the plurality of mirror elements.

7. The optical modulation device of claim 1,
wherein the plurality of mirror elements are arranged in a first direction, and
wherein refractive indices of the plurality of mirror elements increase stepwise in the first direction.

8. The optical modulation device of claim 1, further comprising at least one from among:
a first insulating layer disposed between the mirror array and the active layer; and
a second insulating layer disposed between the active layer and the nano-antenna array.

9. The optical modulation device of claim 1, further comprising at least one from among:
a first voltage applying unit configured to apply a first voltage to the plurality of mirror elements; and
a second voltage supplying unit configured to apply a second voltage to the plurality of nano-antennas.

10. The optical modulation device of claim 1,
wherein the active layer comprises an electro-optic material that has a permittivity that changes in response to an electric signal applied to the electro-optic material.

11. The optical modulation device of claim 1,
wherein the active layer comprises at least one from among a transparent conductive oxide and a transition metal nitride.

12. The optical modulation device of claim 1, wherein the optical modulation device is configured to modulate a phase of light reflected by the nano-antennas by changing the physical properties of the active layer according to the electric conditions.

13. An optical apparatus comprising the optical modulation device of claim 1.

14. The optical apparatus of claim 13, wherein the optical modulation device is configured to one-dimensionally or two-dimensionally steer a beam.

15. The optical apparatus of claim 13, further comprising at least one from among a LiDAR apparatus, a three-dimensional image acquisition apparatus, a three-dimension sensor, and a depth sensor.

16. A method of operating the optical modulation device of claim 1, the method comprising modulating light incident on the optical modulation device,
wherein the modulating of the light incident on the optical modulation device comprises applying a uniform voltage to the plurality of pixel regions that correspond to the plurality of mirror elements such that the uniform voltage is applied to a first pixel region corresponding to the first mirror element and such that the uniform voltage is applied to a second pixel region corresponding to the second mirror element.

17. The method of claim 16,
wherein the applying of the uniform voltage to the plurality of pixel regions comprises applying a first voltage to the plurality of mirror elements.

18. The method of claim 16,
wherein the applying of the uniform voltage to the plurality of pixel regions comprises applying a second voltage to nano-antennas, from among the plurality of nano-antennas, corresponding to the plurality of mirror elements.

19. The method of claim 16,
wherein the applying of the uniform voltage to the plurality of pixel regions further comprises:
applying a first voltage to the plurality of mirror elements; and
applying a second voltage to nano-antennas, from among the plurality of nano-antennas, corresponding to the plurality of mirror elements.

20. The method of claim 16,
wherein the modulating of the light incident on the optical modulation device further comprises applying a second uniform voltage to the plurality of pixel regions that correspond to the plurality of mirror elements.

* * * * *